July 7, 1964 J. N. RUPARD 3,140,359

PLURAL TRACK TAPE RECORDER

Filed July 7, 1959 4 Sheets-Sheet 1

INVENTOR.
John N. Rupard
BY
Bacon & Thomas
ATTORNEYS

July 7, 1964 J. N. RUPARD 3,140,359

PLURAL TRACK TAPE RECORDER

Filed July 7, 1959

4 Sheets-Sheet 2

INVENTOR.

John N. Rupard

BY

Bacon & Thomas

ATTORNEYS

July 7, 1964

J. N. RUPARD 3,140,359

PLURAL TRACK TAPE RECORDER

Filed July 7, 1959

4 Sheets-Sheet 3

INVENTOR.

John N. Rupard

BY Bacon & Thomas

ATTORNEYS

July 7, 1964 J. N. RUPARD 3,140,359

PLURAL TRACK TAPE RECORDER

Filed July 7, 1959 4 Sheets-Sheet 4

INVENTOR.

John N. Rupard

BY

Bacon & Thomas

ATTORNEYS

United States Patent Office 3,140,359
Patented July 7, 1964

3,140,359
PLURAL TRACK TAPE RECORDER

John N. Rupard, P.O. Box 357, Independence, Kans.

Filed July 7, 1959, Ser. No. 825,581
12 Claims. (Cl. 179—100.2)

This invention relates generally to a novel plural track tape recorder, and more specifically to a magnetic type of tape recorder employing a wide tape on which a plurality of parallel sound tracks may be recorded, and employing an adjustable erasing, recording and playback head which may be selectively positioned to operate along any one of such sound tracks. While a recorder of this type finds special application in the fields of radio and television broadcasting, it is apparent that it also has many applications in other fields.

In broadcasting, it is common practice to record material, such as announcements, sound effects and other sound and/or recorded information for subsequent broadcasts. This practice prevails in single stations, national chains and international transcription networks and advertising agencies. The reasons for such recordings are numerous, including, but not limited to (1) most effective use of a given voice, sound effect or other material at a time or place when the original material would not be available, (2) perfection of material, by recording and re-recording, before actual broadcast, and (3) economy of multiple voices, effects and other recorded information at various times and places for which it would not be practical to have the original recorded material and talent assembled.

Such material is now commonly recorded in two principal ways: by disc (or transcription) recording and by reel type magnetic tape recording. These methods present certain difficulties overcome by my new recorder.

Disc (or transcription) recording is subject to the following disadvantages: (1) Discs become noisy with repeated use. (2) Disc recording blanks are not re-usable for other recorded material (i.e., cannot be erased) and are therefore comparatively expensive. (3) The number of announcements or other material that can be recorded on a single disc is limited and therefore there is created a problem of cataloging and filing of discs. (4) Individual tracks (or announcements) on a given disc are not readily identifiable for reproduction. (5) To reproduce a given announcement from a disc recording, the operator must first select the right disc from the transcription file, place it on a transcription turntable, select visually the exact cut or track desired, and then aurally or by blank turn counts, "cue" the material for broadcast, all of which is time consuming and inherent with possibilities of error. (6) Disc recording requires the constant attention of a skilled technician.

Reel type magnetic tape recording has overcome many of the above disadvantages of disc recording in that taped material does not become noisy with repeated use; tapes may be erased and reused time and time again, effecting economy of material; and less skill and attention is required to record on magnetic tape. However, conventional reel type magnetic recording is even more difficult than disc recording to store, catalogue and prepare for broadcast. A standard 1200 foot reel of magnetic recording tape may contain as many as thirty (30) one minute announcements with no practical way to identify a given announcement and cue it for broadcast without aural monitoring or a complicated system of visual, subaudible tone control, or indexing. Reel rewind time does not permit announcements on a given reel to be broadcast in close time proximity.

The recorder I have invented will overcome these disadvantages and present certain other advantages of which the following is a partial listing; others will occur in actual operation:

(1) Individual or all recorded tracks can be erased and the tape reused again and again, effecting economy of material.

(2) The recording operation does not require the constant attention of a skilled technician, releasing qualified personnel for more productive work.

(3) Recorded tracks do not become noisy with repeated use.

(4) Indexing, cataloging, storage and selection are simplified.

(5) Individual recorded tracks can be selected immediately and are automatically cued for broadcast.

(6) Different tracks on a roll of one hundred or more announcements can be broadcast within a time proximity of substantially less than one minute.

It is an object of the invention, therefore, to provide a novel plural track tape recorder employing a wide tape capable of containing a large number of recorded tracks in parallel, any one of which may be selectively recorded, played or erased.

It is a further object of the invention to provide a novel mechanical transmission to drive the tape forward at a constant variable rate of speed, and to drive the tape in a reverse direction at a much higher speed, employing a reversible, electric motor as the power source.

It is a further object of the invention to provide, in a magnetic type tape recorder, an electrical circuit for automatically rewinding the reel after each playback, stopping the motor at the end of the rewind, and operating the motor in a forward direction until the playback is "on cue."

These and further objects of the present invention are obvious from the description which follows, reference being made to the accompanying drawing illustrating a preferred embodiment, in which.

Figure 1:
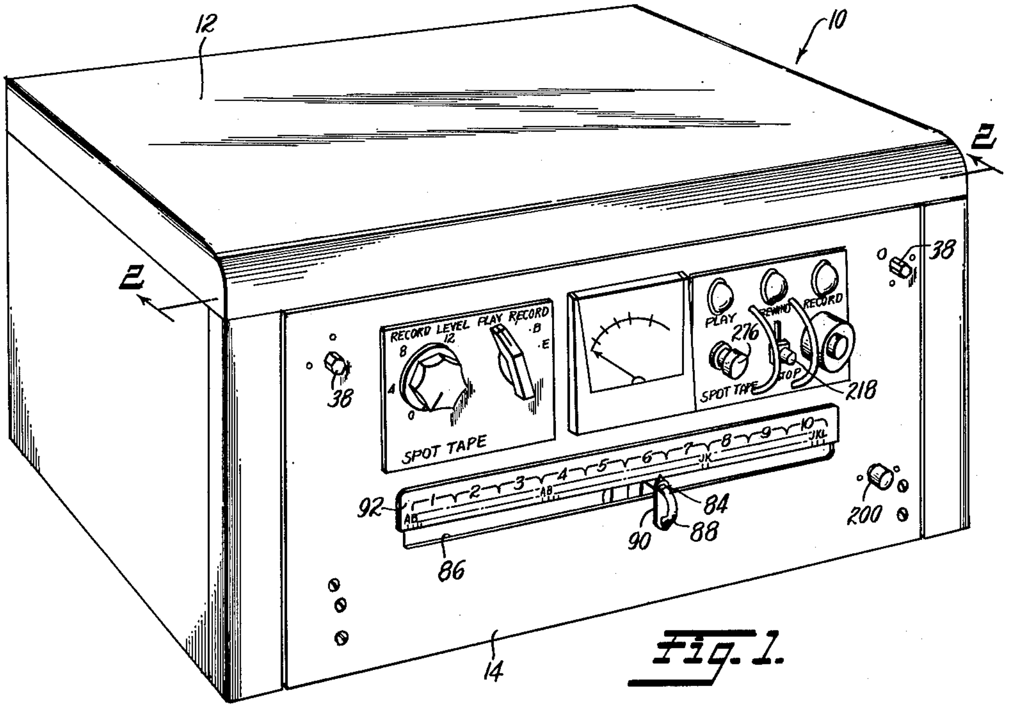
FIG. 1 is a perspective view of the recorder as enclosed within a cabinet.

Referring to the drawings, in which the same element in the different views is indicated by the same reference character, the invention comprises a recorder designated in its entirety by the reference numeral 10. Referring to FIG. 1, the recorder includes a cabinet 12, having a front instrument and control panel 14, which is pivotally mounted on a chassis as will be described hereinafter.

With reference to FIGS. 2, 3, 4 and 5, the chassis includes a pair of side members 16 and 18, which are held in spaced relation by a pair of top and bottom rear alignment bars 20 and 22, and by a lower, front, alignment bar 24, which is secured to the side members 16 and 18 by screws 26. A bottom wall 28 is secured to the bottom alignment bars 22 and 24, as shown in FIGS.

4 and 5, and serves as a supporting means for a number of components which form no part of this invention and therefore are not described.

A pair of supporting brackets 30 are secured to the lower part of the back wall of the instrument and control panel 14 (FIGS. 3 and 4), and serve to pivotally mount the panel for movement about a pivot support 32, permitting the panel to be swung in a forward or outward direction. The upper, inner, corners of the panel carry latch members 34, which are rotated to engage a pair of brackets 36 carried by the forward, upper, corner of the side members 16 and 18 (see FIGS. 2 and 4). The latch members 34 are mounted for rotary movement, having a portion extending through the panel 14, including a head 38 having flat sides thereon for engagement with a wrench or similar tool to facilitate operation of the latching members.

Figure 4:
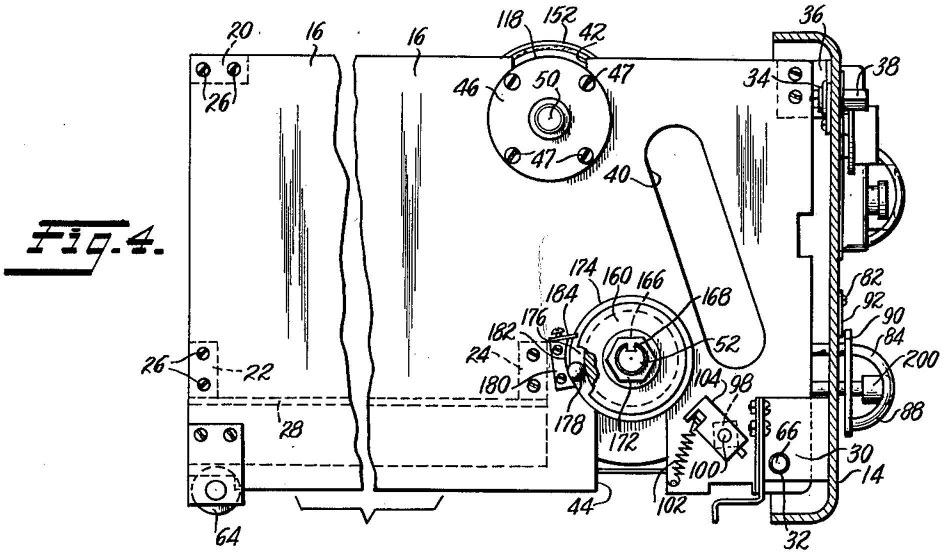
FIG. 4 is a left hand end view on the line 4—4 of FIG. 2, illustrating certain mechanical features.

Referring to FIG. 4, an elongated slot 40 is provided in the side member 16, in alignment with a movable carriage to be described hereinafter, to permit access to the various electric connections on the carriage.

Figure 5:
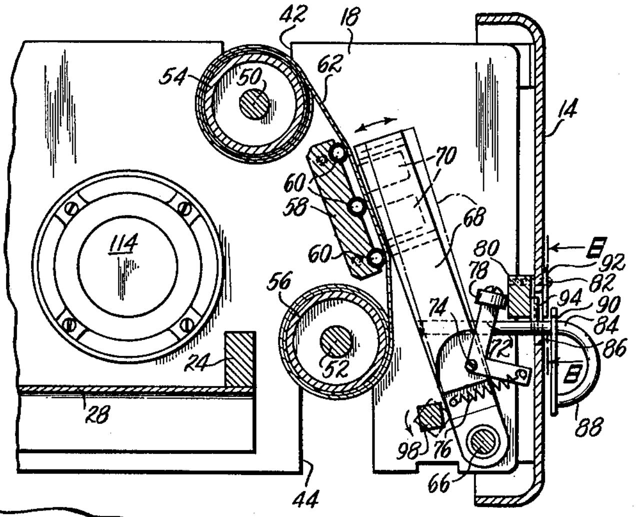
FIG. 5 is a sectional view along the line 5—5 of FIG. 2, illustrating the feed and take-up reels and the pivoted playing head.

Side members 16 and 18 are provided with upper and lower vertically extending slots 42 and 44, adapted to receive a pair of upper bearings 46 and a pair of lower bearings 48. These bearings are held in place by means of a plurality of screws 47 passing through openings in flanges on the bearings and threaded bores in the side members. A shaft 50, adapted to receive a supply reel 54, and a shaft 52, adapted to receive a take-up reel 56, are supported in the upper and lower bearings 46 and 48, respectively. Extending transversely of the chassis, between the supply and take-up reels 54 and 56, is a tape pressure bar 58 (FIG. 5). Tape pressure bar 58 is provided with three longitudinally extending spaced bearing surfaces 60, over which a recording tape 62 is adapted to traverse. As noted in FIG. 5, tape pressure bar 58 is arranged at an angle to the vertical, causing slight displacement of tape 62 as it passes from one reel to the other. The rear lower corners of side members 16 and 18 carry a pair of rollers 64, to facilitate the removal and replacement of the chassis with reference to the cabinet.

An elongated guide rod 66 is supported in the lower, front, corner of the chassis, having extensions which pass through openings in the side members 16 and 18, and serves as a guide means for a carriage 68, as well as a support means for the brackets 30 and pivotal mounting 32 of the panel thereon.

Carriage 68 is freely movable on guide rod 66, so that it can be slid laterally thereon as well as rocked through a small angle about the guide rod as a pivot. The upper end of the carriage supports a pair of recording, playback and erasing heads 70, arranged in spaced relation and lying along a common vertical axis. As shown in FIG. 5, these heads 70 are adapted to contact spaced portions of tape 62 between the spaced bearings surfaces 60. A bell brank lever 72 is pivotally supported at 74 near the lower end of carriage 68, the lower arm of which is connected to a spring 76 having one end connected to the carriage. The other end of bell crank lever 72 carries a roller 78 adapted to ride along a surface of a latch bar 80. From the foregoing, it is evident that the action of spring 76, intended to cause rotation of bell crank 72 in a clockwise direction, produces a reaction at pivot 74, causing the heads 70 into yielding contact against tape 62. Latch bar 80 is secured to the panel 14 by means of a plurality of screws 82.

Carriage 68 is also provided with a manually operated handle 84, which passes through an elongated slot 86 in the panel 14, positioned immediately below latch bar 80. The outer end of handle 84 has a hooked portion 88, which is intended to be grasped by the hand of the operator in shifting the carriage. Hooked end 88 carries a pointer 90 which travels along a scale 92 to cooperate with a number of indications thereon. Handle 84 also carries a latch 94, which is positioned between latch bar 80 and scale 92, and is adapted to be received within any one of a number of latch receiving notches 95 provided in the front face of latch bar 80.

Figure 6:
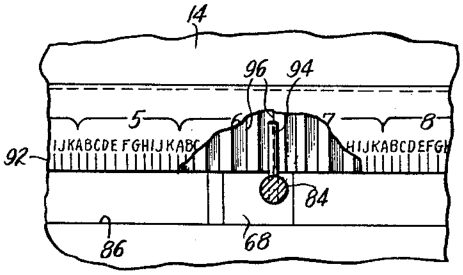
FIG. 6 is a front elevation view of a portion of the instrument and control panel, a part of which is broken away to illustrate certain details.

Referring to FIGS. 1 and 6, it will be observed that scale 92 is subdivided into 10 equal divisions designated 1, 2, 3 . . . 10, and that each division is further divided into a number of subdivisions, designated as A, B, C . . . L. Each subdivision is indicated by a small vertical line adjacent the path of travel of the indicating portion of pointer 90. Latch bar 80 has a number of latch receiving notches 96 thereon corresponding to the number of subdivisions A, B, C, etc., and arranged to lie directly in line with the scale indications therefor, so that the latch 94 will fall into a properly aligned latch receiving notch 96 for each selected position on the scale that pointer 90 may be set.

From the foregoing, it is evident that the carriage may be adjusted by manually grasping hooked portion 88 of the handle 84 and then pressing downward thereon, and, while depressed, sliding the handle laterally to the selected subdivision indication A, B, C, etc. under the desired division marked 1, 2, 3, etc., and then releasing the handle. Slot 86 is considerably wider than the thickness of operating handle 84, so that the initial downward movement of the handle permits carriage 68 to be swung in a clockwise direction as viewed in FIG. 5, which movement rotates the heads 70 slightly to the position shown in broken lines, and simultaneously removes latch 94 from engagement with a latch receiving notch 96 in the latch bar 80. Bell crank lever 72 is rotated slightly about its pivot 74, increasing the tension of the spring 76. With the hooked portion 88 in its downwardly depressed position, the carriage can be freely slid laterally, while the roller 78 rides along the rear surface of the latch bar 80 to any selected position desired. When hooked portion 88 is released at the selected position, spring 76 will again return heads 70 into contact with tape 62, and cause latch 94 to engage a corresponding latch receiving notch 96, which will retain carriage 68 in its adjusted position.

Figures 2, 8:
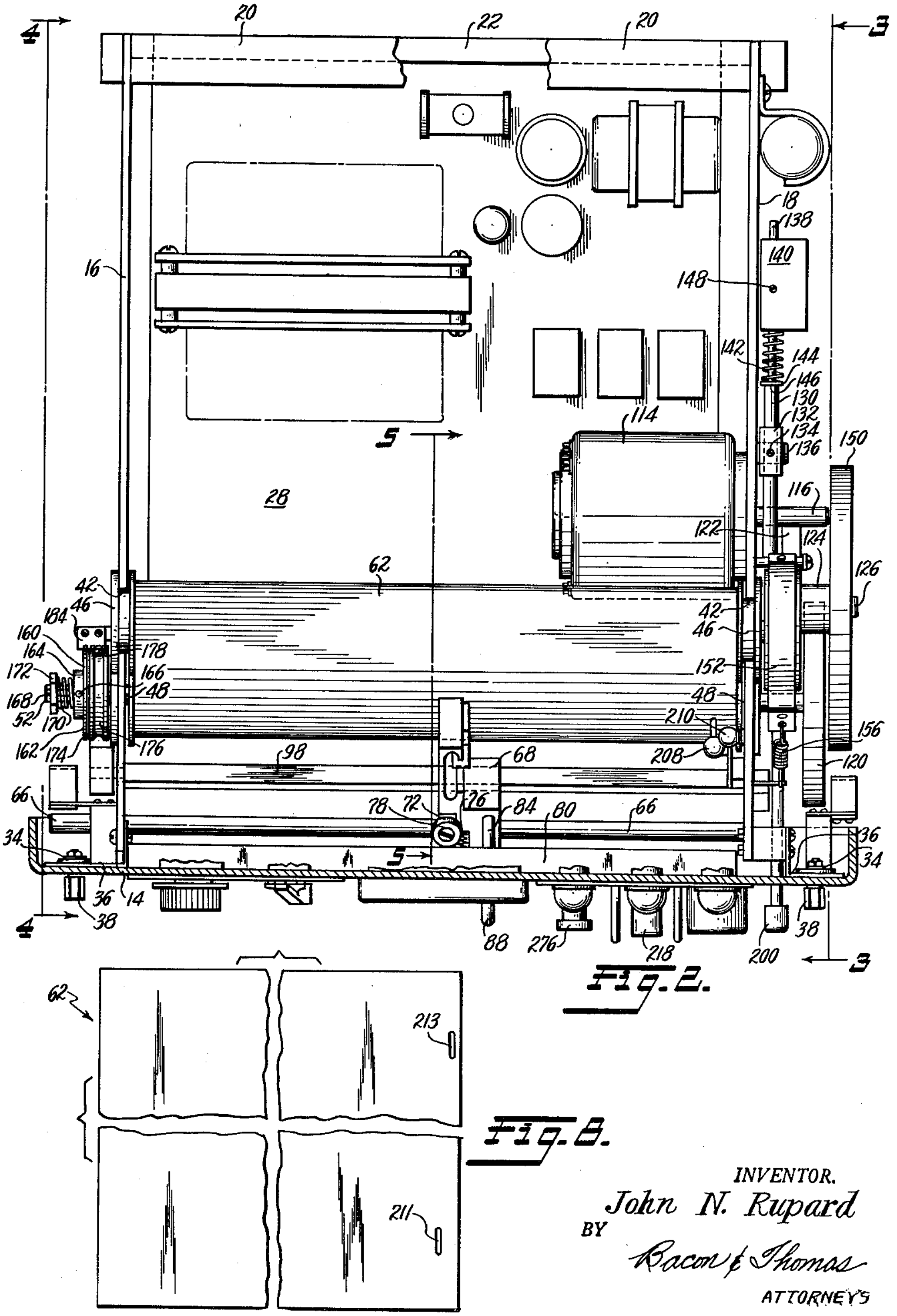
FIG. 2 is a top plan view of the recorder when removed from the cabinet.
FIG. 8 is a view showing end portions of the tape including the slots therein which control the reversing and stopping of the mechanism.

Referring to FIGS. 2, 4 and 5, a cam 8, supported by a cam shaft 100, is arranged with a flat surface thereof spaced slightly from a lower surface of carriage 68. Cam shaft 100 extends through bearings carried by side members 16 and 18. On an extension passing through side member 16, cam shaft 100 carries a lever 104 to which the free end of a spring 102 is fastened, tending to urge the shaft in a counterclockwise direction. An extension on the other end of cam shaft 100, passing through side member 18, carries a lever 106 (FIG. 3), and the action of spring 102 urges the lever 106 into contact with a stop member 107. One end of a link 108 is connected with lever 106, the other end of said link being connected with the core 110 of a solenoid 112. From the foregoing, it is observed that actuation of the link 108 by the solenoid 112 produces an oscillation of cam 98, causing a movement of carriage 68 from the position shown in full lines of FIG. 5 to the position shown in broken lines, which moves the heads 70 away from contact with the tape while the tape 62 is being rewound from take-up reel 56 to supply reel 54.

A reversible electric motor 114 (FIGS. 2, 3 and 5) is supported by screws (not shown) passing through side member 18, and has a drive shaft 116 extending through an opening in said side member. The shafts 50 and 52 have extensions passing through the bearings 46 and 48, respectively, in side member 18. A friction wheel 118 is non-rotatably mounted on the extension of shaft 50 to serve as a driven wheel to rotate the supply reel 54. Similarly, a driven friction wheel 120, having a greater diameter than friction wheel 118, is non-rotatably mounted on the extension of shaft 52 to serve as a driven wheel to rotate the take-up reel 56. Friction wheels 118 and 120 are driven by means of a compound intermediate drive wheel 121 having a larger diameter portion 122 adapted to engage the periphery of driven wheel 118, and a smaller diameter portion 124 adapted to engage the periphery of driven wheel 120. The intermediate drive wheel 121 is made of a suitable material having a relatively high coefficient of friction to avoid slipping when the portions 122 and 124 thereof engage the periphery of the driven wheels 118 and 120, respectively.

The compound intermediate drive wheel 121 is mounted for rotation on a stub shaft 126 carried on a pivotally mounted support member 128. Support member 128 is connected to one end of a pair of rods 138 extending slidably in parallel, spaced, relation through a pair of elongated hollow tubular members 130 supported in spaced holes in a pivotal block 132. Set screws 134 pass through threaded holes in pivotal block 132 and engage the tubular members 130 to prevent axial movement of the rods. A stub shaft 136, carried by side member 18, supports pivotal block 132, permitting oscillation of the pivotally mounted support member 128 and the compound intermediate drive wheel 121 through a small arc from a position in which the portion 122 engages the periphery of driven wheel 118, shown in broken lines in FIG. 3, to a position in which the portion 124 engages the periphery of driven wheel 120, shown in solid lines.

The outer ends of rods 138 pass through a pair of spaced holes in a counterweight 140. A pair of springs 142 have one end in the bottom of bores 143 in counterweight 140, and the other ends engage collars 144 contacting the end 146 on tubular members 130. A set screw 148, passing through a threaded hole in the counterweight 140 and contacting rod 138, permits adjustment of the counterweight and retains the counterweight in adjusted position. The springs 142 urge the rods 138 and the support member toward the right in FIG. 3, whereby the portion 122 of compound intermediate drive wheel 121 is resiliently urged into frictional contact and driving relation with motor shaft 116. A flywheel 150 is secured to the outer end of compound intermediate drive wheel 121 to rotate therewith to provide a predetermined inertia.

Figure 3:
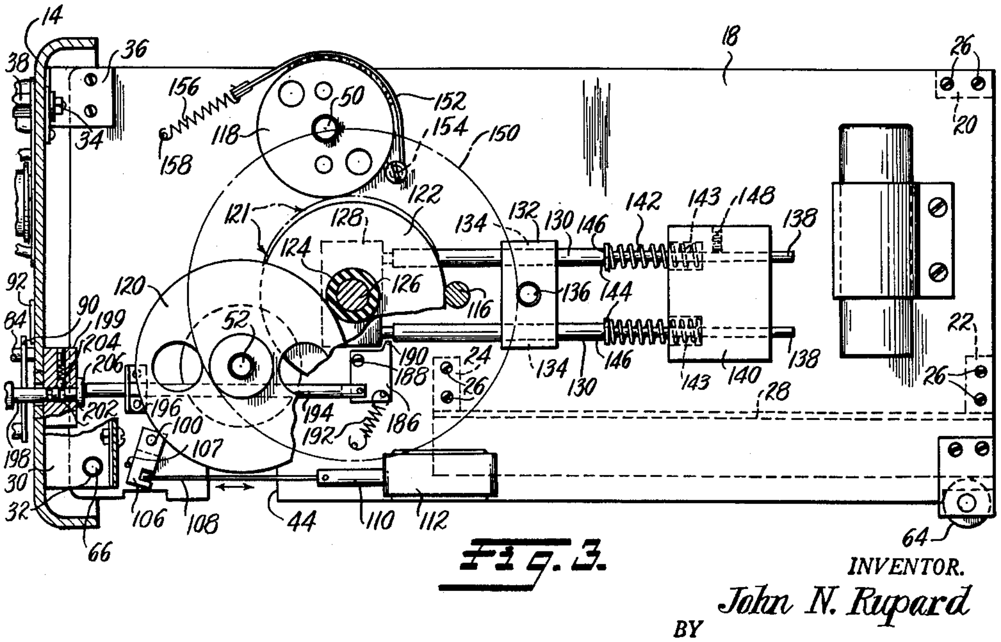
FIG. 3 is a right hand end view taken on the line 3—3 of FIG. 2, illustrating the mechanical transmission, certain parts being broken away.

From the foregoing, it will be evident that rotation of the motor shaft 116 in a counterclockwise direction, as viewed in FIG. 3, will force the compound intermediate drive wheel 121 to oscillate in a counterclockwise direction about its pivotal mounting 136, bringing the smaller diameter portion 124 into frictional contact with the periphery of large diameter driven wheel 120, as appearing in solid lines. Compound intermediate drive wheel 121, rotating in a clockwise direction, causes a counterclockwise rotation of driven wheel 120 and shaft 52. The reduction gearing described produces a relatively slow rotation of the take-up reel 56 carried by shaft 52, corresponding to the forward traverse of recording tape 62 from the supply reel 54 to the take-up reel 56 for recording, playback or erasing. Rotation of the motor shaft 116 in a reverse, or clockwise, direction, as viewed in FIG. 3, would swing the compound intermediate drive wheel 121 through an arc in a clockwise movement about the pivotal mounting 136, to the broken line position, in which the larger diameter portion 122 is brought into frictional driving contact with the periphery of driven wheel 118. Portion 122 is driven in a counterclockwise direction, causing driven wheel 118 and shaft 50 to be rotated at a relatively high speed in a clockwise direction. Tape 62 is thereby rewound from take-up reel 56 to supply reel 54 at high speed.

A one-way brake, comprising a friction band 152, contacts the periphery of the driven wheel 118, as shown in FIG. 3. One end of the friction band 152 is pivotally supported on a pin 154 carried by side member 18, and the other end is connected to the free end of a tension spring 156, the fixed end of the spring being secured to a pin 158. When the driven wheel 118 is rotated clockwise by contact with portion 122 of the compound intermediate drive wheel 121, as shown in broken lines, which represents the rewind operation of the tape, spring 156 will yield and there will be very little braking action produced by friction band 152. On the other hand, when power is supplied to the driven wheel 120 as shown in full lines, causing the tape 62 to traverse from supply reel 54 to the take-up reel 56, the shaft 50 and the driven wheel 118 will be caused to rotate in a counterclockwise direction. The action of spring 156 on one end and the fixed connection 154 on the other end of friction band 152 produces a braking action or drag on the driven wheel 118, thereby retaining the tape 62 taut as it passes from supply reel 54 to take-up reel 56, and preventing overrunning of the supply reel if the take-up reel is suddenly stopped.

Take-up reel 56 is also provided with a one-way brake. Referring to FIGS. 2 and 4, the end of shaft 52, remote from the end which carries the driven wheel 120, has an extension beyond the bearing 48. A brake disk 160, carrying friction material 162 on one face and having a collar 164 integral with the other face, is adapted to be non-rotatably and axially slidably mounted on the extension of shaft 52. For this purpose, a pin 166 passes through a threaded bore in the collar 164, and the inner end of the pin is loosely received within an axially extending keyway 168 in the periphery of the extension, whereby the brake disk 160 may slide axially of the extension but is incapable of relative rotation thereon. A coil spring 170, surrounding the extension of shaft 52, resiliently urges the brake disk 160 towards a collar 174 freely rotatable on the extension of shaft 152. One end of coil spring 170 engages the collar 164 on friction disk 160, and the other end engages a nut 172 threaded on the outer end of the extension. The compressive force of coil spring 170 may be adjusted by rotation of the nut 172.

Collar 174 is provided with flat side surfaces, one of which contacts the friction material 162 carried by the brake disk 160. The periphery of collar 174 has an annular groove 176 within which a ball 178 is adapted to roll. A block 180 is mounted on the side member 16 to one side of the collar 174, and is provided with an arcuate groove or track 182 on the side thereof adjacent the collar. Arcuate groove 182 is eccentric with respect to the annular groove 176 in collar 174, and the grooves are located in close proximity so that the ball 178 rolls in both grooves. The ball cannot fall out of the lower end of arcuate groove 182 because of the eccentricity thereof, which brings the bottom of the lower end of the groove 182 in closer proximity to the bottom of annular groove 176 in the collar 174 than the diameter of the ball. The ball is prevented from being thrown out of the upper end of arcuate groove 182 by the presence of a stop 184 carried by the block 180 and extending across the end of groove 182.

The operation of the one-way brake described above is as follows: Referring to FIGURE 4, assume first that the shaft 52 is rotating in a clockwise direction in which power is applied to the shaft by means of the portion 124 of compound intermediate drive wheel 121 engaging the periphery of driven wheel 120, as shown in full lines in FIG. 3, causing forward movement of tape 62, which now feeds from supply reel 54 to make-up reel 56, as shown in FIG. 5. Disk 160 is rotated by shaft 52 and, due to the friction between the surface 162 and the side of collar 174, the collar is rotated with the shaft. Ball 178 is caused to roll upward in the arcuate groove 182, and, because of the eccentricity of the groove, offers no resistance to the rotation of collar 174. Assuming next that shaft 52 rotates in a counterclockwise direction as viewed in FIG. 4, when the direction of the tape 62 is reversed in rewinding, and the collar 174 is rotated by the friction surface 162 on disk 160 in the same direction as shaft 52. The ball 178 is caused to be wedged in the lower part of arcuate groove 182, as shown in FIG. 4, thus preventing the rotation of collar 174 with shaft 52. Since the collar 174 is held stationary, the relative movement of disk 160 thereto produces a drag on said disk and shaft 52, serving to produce a braking action on the take-up reel 56 when the tape 62 is rewound on the supply reel. This one-way braking action maintains the tape 62 taut and prevents overrunning if the supply reel 54 is suddenly stopped.

A manually actuated means is provided to maintain the compound intermediate drive wheel 121 in an inoperable position when the apparatus is not in use, to avoid the formation of irregular surfaces on the periphery of the drive portion 124 due to prolonged contact at one point thereof with the periphery of driven wheel 120. For this purpose, a block 186 is provided (FIG. 3), pivotally supported on a screw 188 mounted in side member 18. A corner of block 186 has a finger 190 thereon adapted to engage the lower right corner of the support member 128 when the block 186 is swung in a counterclockwise direction against the tension of a spring 192. One end of a link 194 is connected to the block, the other end of the link passing through a guide in a bracket 196 carried by side member 18. Link 194 is operated by an operating rod 198 guided in a bore in block 199 supported on the rear wall of panel 14. A portion of operating rod 198 extends through an opening in the panel 14 and has an operating head 200 on the end for manual actuation. A pair of spaced annular grooves 202 on the periphery of operating rod 198, within the bore in guide block 199, cooperate with a spring pressed detent 204 to retain the operating rod in either one of two limiting positions. A button 206 on the inner end of operating rod 198 engages the end of link 194 and limits the outward movement of the operating rod. When the apparatus is not in use, head 200 of operating rod 198 is pressed inwardly, which produces a counterclockwise movement of block 186 about its pivot 188, causing finger 190 to engage the lower right hand corner of the support member 128 and lift portion 124 from contact with the periphery of driven wheel 120. If it is desired to operate the apparatus, the head 200 is pulled outwardly, whereupon spring 192 retracts the finger 190 from the lower right hand corner of the support member 128, permitting the intermediate driving wheel 121 free movement to engage either driving wheel 118 or 120. The spring pressed detent 204 engages one of the annular grooves 202 to retain the operating rod 198 in either its operating or non-operating position.

Figure 7:
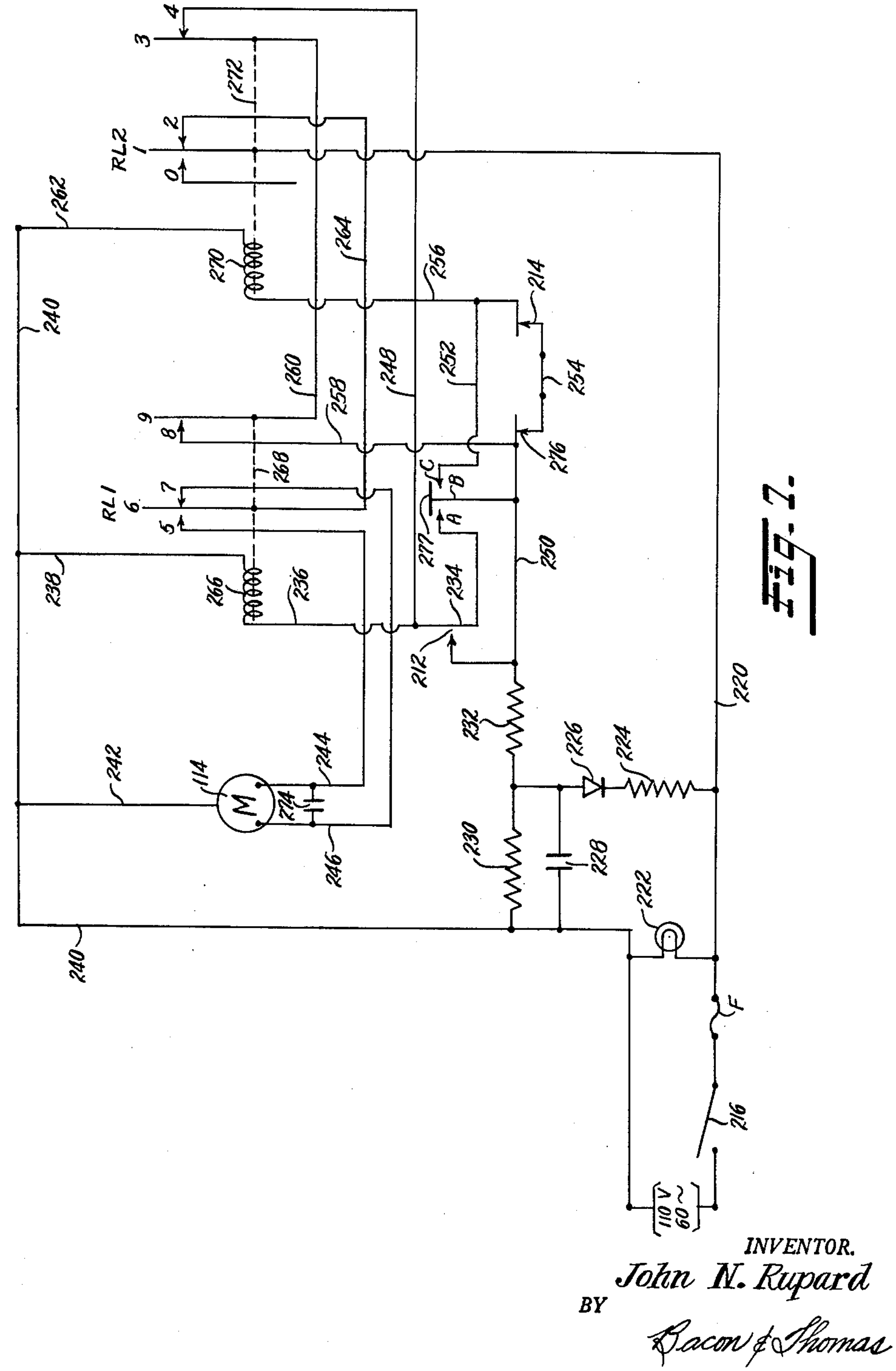
FIG. 7 is a schematic representation of a control circuit.

Side member 18 supports a pair of spaced lamps 208 and 210 adapted to energize a pair of photoelectric cells indicated as switches and designated by the numerals 212 and 214 in FIG. 7. In operation, tape 62 is provided with an elongated "on cue" slot 211 (FIG. 8) in one end and a spaced elongated reverse wind slot 213 in the other end in alignment with the lamps 208 and 210, respectively, to energize the photoelectric cells 214 and 212, respectively, at predetermined timed intervals, as will be described hereinafter. The control circuit is shown in FIG. 7, and comprises a pair of leads connected to a 110 volt, 60-cycle, source of electrical current. The circuit includes a fuse F and a power switch 216, operated by an operating lever 218 (FIG. 1), forming an On-Off control for the system. Fuse F, connected to a conductor 220 and a pilot lamp 222, provides a visual indication that the circuit is on. A resistor 224 and a selenium rectifier 226 are connected to conductor 220, to provide a source of direct current for operating a pair of relay RL1 and RL2. A capacitor 228 connects the output side of rectifier 226 with return conductor 240. The output side of rectifier 226 is also connected with a pair of resistors 230 and 232, the former resistor connected to the conductor 240 in parallel with capacitor 228. Resistor 232 is connected with switch 212 (photoelectric cell) for relay RL1, which switch is connected to a conductor 234. Conductor 234 has a branch 236 leading to one side of a solenoid 266 of relay RL1, the other end of the solenoid being connected by a conductor 238 to conductor 240. Another branch 248 connects with a stationary contact 4 of a switch 3–4 of relay RL2. A movable contact 3 of said switch is connected by means of a conductor 260 to the movable contact 9 of a switch 8–9, operated by relay RL1. Fixed contact 8 of the latter switch is connected by means of a conductor 258 to a fixed contact of a switch 276, which fixed contact is connected, by means of a conductor 250, to resistor 232. Conductor 220 has connection with a movable contact 1 of a switch 0–1–2 of relay RL2. This latter switch has two fixed contacts, 0 and 2. Contact 0 serves merely as a stop, while contact 2 is connected by means of conductor 264 to the movable contact 6 of a switch 5–6–7 of relay RL1. Fixed contact 5 of the latter switch is connected by conductor 244 to the reverse winding of motor 114, and contact 7 of said switch is connected by means of conductor 246 to the forward winding of the motor. Motor 114 is connected to return conductor 240 by means of a conductor 242. The movable contact of switch 276 is connected by means of conductor 254 to the switch 214 (photoelectric cell), the fixed contact of which has a conductor 256 leading to one end of a solenoid 270, the other end of the solenoid having a conductor 262 leading to the return conductor 240. Conductor 234 is connected to a fixed contact A of a manually actuated switch 277 having a pair of fixed contacts A and C, and a movable contact B, the latter being connected with conductor 250. Fixed contact C is joined to conductor 256 by way of a conductor 252. A conductor 258 is connected at one end with conductor 250 and at its other end to the fixed contact 8 of a switch 8–9 of relay RL1. A capacitor 274 is connected between the conductors 244 and 246 adjacent the motor 114. The movable core of the solenoid 266 of relay RL1 is mechanically connected, as shown at 268, to the movable contacts 6 and 9. Similarly, the movable core of solenoid 270 of relay RL2 is mechanically connected, as shown at 272, with movable contacts 1 and 3.

In operation, the power supply switch 216 is turned on, which energizes the solenoid 270 of relay RL2 to open contacts 1 and 2, and 3 and 4, bringing the movable contact 1 against the fixed contact or stop 0. The flow of current is through closed switch 216, fuse F, resistor 224, rectifier 226, resistor 232, conductor 250, closed switch 276, conductor 254, closed switch 214 (photoelectric cell), conductor 256, solenoid 270, and conductors 262 and 240. No current is delivered to the motor 114. The recorder is now in a ready position, which is indicated by the illumination of pilot lamp 222. The tape is "on cue" with the slot 211 between the lamp 208 and the photoelectric cell (switch 214), whereby the circuit through that switch will be closed, as shown in FIG. 7. Depressing or opening the switch 276 momentarily disconnects the power supply to the solenoid 270 of relay RL2, releasing the coil and closing the contacts 1 and 2 of switch 0–1–2 and the contacts 3 and 4 of switch 3–4. Electric current can now flow by way of conductor 220, closed contacts 1, 2, conductor 264, closed contacts 6 and 7 of switch 5–6–7 of relay RL1, conductor 246, forward winding of motor 114, and conductors 242 and 240, to operate the motor in a forward direction for erasing, recording or playback operation. There is no current flow through the contacts 3 and 4 at this time, because the switch 212 (photo-electric cell) is open. Switch 214 consists of a pair of contacts operated by a photoelectric cell energized by one of the lamps 208 and 210 through slot 211 in the tape 62 when the tape 62 moves forward under operation of motor 114, as described above. Once started, the "on cue" slot 211 in tape 62 is moved from the photoelectric cell, and the contacts of switch 214 are open. The starting switch 276 may thereafter be released to close the switch without reenergizing solenoid 270.

The mechanism continues in a forward direction until the second or rewind slot 213 in the tape, near the end thereof, is brought between the lamp 210 and the switch 212 (photoelectric cell) to close the contacts and to energize solenoid 266 of relay RL1. A current flow is established through conductor 220, resistor 224, rectifier 226, resistor 232, switch 212, conductors 234 and 236, solenoid 226, and conductors 238 and 240. Energization of the solenoid 266 causes the coil, through the link 268, to move the movable contact 6 of switch 5–6–7 from engagement with the fixed contact 7 into engagement with fixed contact 5, and to close contacts 8 and 9 of switch 8–9. The flow of current is by way of conductor 220, contacts 1 and 2 of switch 0–1–2, conductor 264, contacts 5 and 6 of switch 5–6–7, conductor 244 through the reverse winding of motor 114, and conductors 242 and 240. Motor 114 is now driven in a reverse direction for rapid rewind operation of the tape 62. As switch 212 is opened as soon as the rewind operation begins, because of the movement of slot 213 in the tape from proximity with the photoelectric cell, a holding circuit is established by way of conductors 250 and 258, closed contact 8 and 9 of switch 8–9, conductor 260, closed contacts 3 and 4 of switch 3–4, conductors 248 and 236, solenoid 266 of relay RL1, and conductors 238 and 240. The latter holding circuit will remain unbroken during the rewind operation until the "on cue" slot 211 in tape 62 passes between lamp 208 and switch 214 (photoelectric cell), which momentarily closes the switch 214. Starting switch 276 having previously been released is now also closed, and the closing of switch 214 reenergizes solenoid 270 of relay RL2, opening the contacts 3–4 of the switch 3–4 to break the holding circuit of relay RL1. Release of the holding circuit separates contacts 5 and 6 of switch 5–6–7 and contacts 8–9 of switch 8–9, returning them to the position shown in FIG. 7, in which movable contact 6 engages fixed contact 7. This interrupts the flow of current for reverse operation of motor 114. At the same time energization of solenoid 270 breaks the contact between the contacts 1 and 2 of switch 0–1–2. A unique feature of the rewind operation is the momentum of the mechanism due to the flywheel 150, which carries the tape and the "on cue" slot 211 past the switch 214 (photoelectric cell), which reopens said switch and deenergizes solenoid 270 to reestablish contact between the contacts 1 and 2 of switch 0–1–2 and contacts 3 and 4 of switch 3–4. Electric current can again flow through the motor 114 through conductor 220, contacts 1 and 2, conductor 264, contacts 6 and 7, and conductor 246 through the forward winding of motor 114, conductors 242 and 240. The motor 114, while continuing to rotate in a reverse direction as a result of its own momentum and that of the fly wheel 150, is gradually brought to a stop and then proceeds in a forward direction at normal operating speed, causing a forward traverse of the tape 62. This forward operation continues until the "on cue" slot 211 in the tape 62 passes between the lamp 108 and the switch 214 (photoelectric cell), which closes the circuit to reenergize solenoid 270 and break the connections 1 and 2 of switch 0–1–2 and connections 3 and 4 of switch 3–4. The motor 114 is now stopped with the tape in its "on cue" position and is in a ready position on the exact cue for any sound track to be selected. The play can be started simply by pressing switch 276 which breaks the flow of current to the solenoid 270 of relay RL2.

Switch 277 comprises a single pole, double throw, switch having a movable contact B and fixed contacts A and C. By swinging fixed contact B toward the left to engage the movable contact A, a holding circuit passes through solenoid 266 of relay RL1, for operation of motor 114 in a reverse direction. Similarly, swinging of contact B to its neutral positon deenergizes the solenoids 266 and 270, and allows current to flow to motor 114 for forward operation. Swinging movable contact B against fixed contact C energizes the solenoid 270 and brings the motor 114 to rest.

While, in the preferred embodiment described above, the direction of rotation of the reels is changed by means of a reversible electric motor, it is obvious that the same result could be obtained by the employment of a unidirectional running motor, and forward and reverse gearing actuated electromagnetic clutches, as is well known in the art.

Having fully described by invention, it is to be understood that I do not wish to be limited to the details set forth herein, but that my invention is of full scope of the appended claims.

I claim:

1. A plural track magnetic tape recorder, comprising: a supply reel and a take-up reel adapted to receive a wide tape capable of recording a plurality of sound tracks in parallel relationship; a tape pressure bar mounted between said reels over which the tape is adapted to traverse, means driving said reels in a forward direction at a predetermined speed for recording, playback, or erasing, and in a reverse direction at a higher speed for rewinding; a carriage carrying magnetic recording, playback and erasing heads; means pivotally and slidably mounting said carriage for movement relative to said tape pressure bar, and a single, manually operable, means directly connected with said carriage to pivot said carriage to move the heads from a position in contact with a tape traversing said pressure bar to a position spaced therefrom, and to slide said carriage laterally to position the heads in alignment with any selected sound track on the tape.

2. A plural track magnetic tape recorder according to claim 1, including pivotally mounted means carried by said carriage to resiliently urge said carriage in a direction which brings the heads thereon into contact with a tape traversing said pressure bar.

3. A plural track magnetic tape recorder according to claim 1, including an instrument and control panel having a slot therein, a latch bar mounted on said panel adjacent said slot, said latch bar having a plurality of spaced latch-receiving notches therein corresponding in number and spacing with the sound tracks on the tape; pivotally mounted means carried by said carriage to resiliently urge said carriage in a direction which brings the heads thereon into contact with a tape traversing said pressure bar; said manually operable means including a handle extending through said slot, said handle carrying a latch engageable with a notch in said latch bar.

4. A plural track magnetic tape recorder according to claim 3, in which said means to resiliently urge the carriage includes a reaction member engaging said latch bar.

5. A plural track magnetic tape recorder comprising: a supply reel and a take-up reel adapted to receive a wide tape capable of recording a plurality of sound tracks in parallel relationship; a tape pressure bar mounted between said reels over which the tape is adapted to traverse; a carriage carrying magnetic recording, playback and erasing heads; means pivotally and slidably mounting said carriage for movement relative to said tape pressure bar; a single, manually operable, means directly connected with said carriage to pivot and slide said carriage to align the heads with selected sound tracks on the tape; means driving said reels in a forward direction at a predetermined speed for recording, playback or erasing, and in a reverse direction at a higher speed for rewinding, said means including a reversible motor having a power shaft, friction driven wheels connected to the supply and take-up reels, and an intermediate friction drive wheel between said motor shaft and said supply reel and take-up reel driven wheels, means for pivotally supporting said intermediate friction drive wheel for oscillation between positions engaging either the supply reel driven wheel or the take-up reel driven wheel, whereby rotation of the motor in one direction produces an oscillation of said pivotally supported intermediate drive wheel for engagement with one driven wheel and rotation in the other direction produces an oscillation of said pivotally supported intermediate drive wheel for engagement with the other driven wheel.

6. A plural track magnetic tape recorder according to claim 5, including counterbalancing means connected to said pivotal supporting means.

7. A plural track magnetic tape recorder according to claim 5, including one-way friction brakes connected to the supply reel and to the take-up reel.

8. A plural track magnetic tape recorder according to claim 5, including manually operable means to retain the intermediate friction drive in a non-engaging position between the driven wheels.

9. A plural track magnetic tape recorder comprising: a supply reel and a take-up reel adapted to receive a wide tape capable of recording a plurality of sound tracks in parallel relationship; a tape pressure bar mounted between said reels over which the tape is adapted to traverse; a carriage carrying magnetic recording, playback and erasing heads; means pivotally and slidably mounting said carriage for movement relative to said tape pressure bar, whereby the carriage may be pivoted to move the heads from a position in contact with a tape traversing said pressure bar to a position spaced therefrom, and laterally slid to position the heads in alignment with any selected sound track on the tape; an electric motor; transmission means between said motor and said reels to feed a tape in one direction for recording, playback or erasing, and in a reverse direction for rewinding; a control circuit for said motor, said control circuit including means cooperable with means carried by a tape, to reverse the direction of rotation of the reels at the termination of a recording, to rewind the tape, to stop the rotation of the reels at the termination of the rewinding cycle and to operate the reels in a forward direction until the sound on the tape is "on cue," and to stop the reels.

10. A plural track magnetic tape recorder according to claim 9, in which said transmission means includes a flywheel to provide a predetermined inertia in the transmission, whereby, at the termination of a run in the forward or reverse direction, the energization of the motor by the circuit to change its direction, while the transmission continues to turn in an opposite direction by inertia, results in a braking action to gradually stop and change the direction of the transmission.

11. A plural track magnetic tape recorder according to claim 9, in which the circuit includes switches for operating the reels in forward and reverse direction, said switches being actuated by the means carried by the tape.

12. A plural track magnetic tape recorder according to claim 9, in which the circuit includes manually actuated means to control the direction of rotation of the reels.

References Cited in the file of this patent

UNITED STATES PATENTS

| | | |
|---|---|---|
| 2,422,143 | Somers et al. | June 10, 1947 |
| 2,468,198 | Heller | Apr. 26, 1949 |
| 2,513,423 | Owens | July 4, 1950 |
| 2,668,059 | Roberts | Feb. 2, 1954 |
| 2,821,576 | Gaubert | Jan. 28, 1958 |
| 2,911,161 | Proctor | Nov. 3, 1959 |